(12) United States Patent
Smilansky

(10) Patent No.: US 7,489,802 B2
(45) Date of Patent: Feb. 10, 2009

(54) MINIATURE AUTONOMOUS AGENTS FOR SCENE INTERPRETATION

(75) Inventor: Zeev Smilansky, 41 Meishar, 76850 D.N. Emek Soreq (IL)

(73) Assignee: Zeev Smilansky, Emek Soreg (IL)

( * ) Notice: Subject to any disclaimer, the term of this patent is extended or adjusted under 35 U.S.C. 154(b) by 688 days.

(21) Appl. No.: 10/658,819

(22) Filed: Sep. 8, 2003

(65) Prior Publication Data

US 2004/0131231 A1    Jul. 8, 2004

Related U.S. Application Data

(60) Provisional application No. 60/409,665, filed on Sep. 10, 2002.

(51) Int. Cl.
*G06K 9/00* (2006.01)

(52) U.S. Cl. ............... 382/103; 382/104; 382/106; 382/156; 348/699; 348/169; 348/170; 348/143; 348/153

(58) Field of Classification Search ........... 382/106, 382/103, 104, 156; 348/699, 169, 170, 143, 348/153, 154, 155; 327/51; 375/240.06, 375/240.16, 240.17; 235/454, 462.14, 462.01
See application file for complete search history.

(56) References Cited

U.S. PATENT DOCUMENTS

| | | | | |
|---|---|---|---|---|
| 5,091,780 A | * | 2/1992 | Pomerleau | 348/152 |
| 5,999,634 A | * | 12/1999 | Abbott et al. | 382/103 |
| 6,493,041 B1 | * | 12/2002 | Hanko et al. | 348/699 |
| 6,801,662 B1 | * | 10/2004 | Owechko et al. | 382/224 |
| 2002/0176605 A1 | * | 11/2002 | Stafsudd et al. | 382/106 |
| 2004/0017224 A1 | * | 1/2004 | Tumer et al. | 327/51 |

FOREIGN PATENT DOCUMENTS

| JP | 08077487 | 3/1996 |
|---|---|---|
| JP | 2001126069 | 5/2001 |

* cited by examiner

*Primary Examiner*—Samir A Ahmed
*Assistant Examiner*—Nancy Bitar
(74) *Attorney, Agent, or Firm*—The Nath Law Group; Jerald L. Meyer; Burman Y. Mathis, III

(57) ABSTRACT

A miniature autonomous apparatus for performing scene interpretation, comprising: image acquisition means, image processing means, memory means and communication means, the processing means comprising means for determining an initial parametric representation of the scene; means for updating the parametric representation according to predefined criteria; means for analyzing the image, comprising means for determining, for each pixel of the image, whether it is a hot pixel, according to predefined criteria; means for defining at least one target from the hot pixels; means for measuring predefined parameters for at least one target; and means for determining, for at least one target whether said target is of interest, according to application-specific criteria, and wherein said communication means are adapted to output the results of said analysis.

20 Claims, 6 Drawing Sheets

MINIATURE AUTONOMOUS AGENTS FOR SCENE INTERPRETATION

CROSS-REFERENCE TO RELATED APPLICATIONS

The present application claims the benefit of the filing date of U.S. Provisional Application, Ser. No. 60/409,665 filed Sep. 10, 2002, entitled "MINIATURE OBJECT RECOGNITION SYSTEM".

FIELD OF THE INVENTION

The present invention relates generally to the field of image interpretation systems and more particularly to a miniature autonomous agent for scene interpretation (MAASI), able to perform a large variety of complete tasks of image understanding and/or object recognition.

BACKGROUND OF THE INVENTION

There is a multitude of systems currently available for performing image interpretation tasks. Security monitoring devices, road traffic monitors, people counters in lobbies and malls, and countless additional applications. These systems consist of a front-end having an image acquisition unit, possibly a computational device that performs some computations such as image compression, image formatting, or internet access, and a back-end that includes a computational device and/or a human interface mechanism. The computational device of the backend is responsible for most, or all of the computations performed in the system.

FIG. 1 is a schematic block diagram showing the architecture of existing image acquisition and interpretation systems. Standard acquisition devices 100-103 are installed at the required site. These are more often image acquisition devices, but may also include sensors of other types. In the case of image acquisition devices, either analog or digital video cameras, or other off-the-shelf cameras are used. These deliver standard frame rate and resolution, usually in color. The end-units may sometimes include an image processing device, used for either image compression or for Internet connection. Communication channels 110 are then used to transmit the raw or compressed images to a backend computation device 120. This sometimes consists of multiple processing units 121-124. The communication means 110 are most often cables, either analog or digital but can also sometimes be wireless. The processing unit 120 is sometimes near to the acquisition device, as for example in a home security application where the distance can be a few meters, up to a few tens of meters, or else it can be a long distance away, as in the case of highway traffic control systems, where the distances covered may be many miles. Depending on the system, the backend processor may include one or more of the following applications: image recording and storage 130, usually for regulatory and insurance requirements; image analysis, compression, motion and alert detection, or any other application performed on the main processing cabinet 120; application workstation 140 that allows computerized and/or manual analysis and operation of additional parts of the system (opening/closing gates, illumination control and more); and a monitor-wall 150 with observers looking at the video streams. The entire system is connected by a local area network 125. The person skilled in the art of modern computerized surveillance systems will appreciate that this is a basic configuration and a large variety exists between different systems. However, all these systems have in common the fact that image acquisition and image analysis are partitioned into two parts, front-end and backend, where the major part of the processing is performed in the backend and any front-end processing is limited to image compression, network access or format changing.

In simple systems, raw images only are presented to the operator and/or stored in a storage device. In such systems, the computational part of the front-end may perform tasks of image compression, communication, Internet access etc., all of which are designed to facilitate the communication of the captured images to the backend. In more elaborate systems, there is some automatic analysis of images, performed either by the backend or by the front-end or by both. In such cases, the front-end may perform comparison of an image to a "standard" pre-stored image. However, in all prior art systems, a large part of the computation required for interpretation and understanding of the image is performed by the backend, or else the quality of the automatic interpretation of the system is very low. This means a wide transfer of information from front-end to backend, a large expense in communication and computational means, and as a consequence a high price for the system.

All existing systems use a standard, off the shelf image acquisition device that provides too many pixels at a frame rate that is too high, use standard algorithms that perform expensive processing steps such as edge detection, and as a consequence must rely on large, expensive hardware that cannot be integrated into a small independent unit.

Systems for image acquisition and interpretation are subject to several requirements. First, the system must compensate for varying levels of illumination, such as for example day and night, cloudy or bright day and so on. This requires more than a simple change of shutter speed or other means of exposure compensation, since for example comparing the illumination of a scene at morning to one in the afternoon shows that the illumination in different parts of the scene is changed differently, due to variations in color, angle, texture and additional factors. Second, the system must be able to disregard slow or repeating changes in the scene such as moving shadows, growing plants, tree limbs moving in the wind, falling snow etc. Third, the system must be able to discern automatically between areas that are very noisy (for example a street corner with heavy traffic) and a quiet part (area behind a wall or fence), and be able to adapt itself to maximal detection relative to the objective conditions.

Most existing algorithms for object extraction use computation-intensive steps such as edge detection, object morphology, and template comparison. Additionally, systems that analyze video often require large memory storage space since a number of frames is stored in the memory to allow proper analysis.

JP8077487A2, assigned to Toshiba Corp., discloses an on-road obstacle detecting device. The detection is done by comparing an initial background image with incoming images, to detect a change between the two images.

JP2001126069, assigned to Matsushita Electronic Ind. Co. Ltd., discloses a picture recognition method, whereby an incoming image is compared with a pre-stored image by detecting a part where the difference in luminance is greater than a pre-defined threshold, thus reducing the area of investigation.

U.S. Pat. No. 6,493,041 to Hanko et al discloses a method and apparatus for detection motion in incoming video frames. The pixels of each incoming digitized frame are compared to the corresponding pixels of a reference frame, and differences between incoming pixels and reference pixels are determined. If the pixel difference for a pixel exceeds an applicable pixel difference threshold, the pixel is considered to be "different". If the number of "different" pixels for a frame exceeds an applicable frame difference threshold, motion is considered to have occurred, and a motion detection signal is emitted. In one or more other embodiments, the applicable frame difference threshold is adjusted depending upon the current average motion being exhibited by the most recent frames, thereby taking into account "ambient" motion and minimizing the effects of phase lag. In one or more embodiments, different pixel difference thresholds may be assigned to different pixels or groups of pixels, thereby making certain regions of a camera's field of view more or less sensitive to motion. In one or more embodiments of the invention, a new reference frame is selected when the first frame that exhibits no motion occurs after one or more frames that exhibit motion.

The system disclosed above does not attempt to discern any pattern in the detected changed pixels, thus it is prone to false alarms, since a change in illumination and a change in the scene would both be considered a change. Moreover, a fixed threshold is used by the system to define a change, making the system insensitive to varying illumination conditions. The reference against which incoming images are compared is an image of the scene, giving the system diminished detection potential, due to potential noise and other factors pertaining to one image taken under certain ambient conditions.

Scene interpretation and image recognition systems have a wide variety of applications, some of which are listed below.

Security Systems: The terror wave which has attacked the world in the last 2 years creates the need to defend thousands of kilometers of strategic infrastructure lines such as electric lines (high voltage lines), railroads, water supply lines and public institutes, not to mention international borders. The existing solutions are expensive and are based massively on manpower. This new field, sometimes called homeland defense, is growing in importance all around the world.

Providers of Camera Based Surveillance Systems:
American Security Systems Inc.; Vicon Industries, Inc.; CCS International Inc; Visor Tools Inc, Madrid, Spain; Mate-CCTV LTD, Israel; Sensus Technology Ltd.

Airports: Everyone is familiar with the rush of crowds at airports on any given day, as tens of thousands of people rush from point to point attempting to make connections, keep track of their family members and luggage, grab a bite to eat, and shop. There is a need for an inexpensive, reliable people traffic monitoring system, which will allow airport authorities, vendors, and others to plan effectively based on this flow of people. In today's security threats it should enable better control during an emergency event, such as knowing the number of people in each wing, section, hall and room.

Transportation—Trains: High volume commuter rail systems can greatly benefit by understanding the number of passengers that make use of their service. Ticket sales data provides information regarding paying passengers, types of tickets sold, etc., however ticket sales do not provide information regarding the actual number of passengers making use of the train service in specific travel. Moreover, the distribution of passengers between the train's carriages is important for optimization of the size of the train. During emergency events, knowing the number of people per carriage is critical.

Providers of People Traffic Monitors:
Sensus Technology Ltd., UK; International Communication & Electronics Group, USA (Traffic Pro); Acorel French; CEM Systems Ltd.

Malls and Shopping Centers: There are important marketing needs, which can benefit from monitoring people traffic. Questions such as how many people enter your shop or pass your display, how many customers do or do not make a purchase, correct staffing levels to handle the number of customers, and the adequacy of walking spaces in the shop or display room to handle the pedestrian flow—are of extreme importance for business planning and management. Knowing when and where a customer enters the store can vastly improve on operating effectiveness. By integrating people counting systems with sales data, retailers can obtain conversion ratios or average spending per head and manage cost effectiveness better.

Providers of People Counters for Marketing Research:
Elmech CO., UK; Chamber Electronics, UK; Watchman Electronics, NZ;
RCT Systems Inc from Chicago. USA; FootFall, UK.

Elevator Management: A lot of innovation has been invested in optimizing the operation of a "fleet" of elevators in big buildings (3 elevators and up). Some solutions use queue management with algorithmic scheduling, others rely on artificial intelligence based solutions. Still, we can find ourselves waiting a lot of time for elevators in busy buildings only to find out when the elevator stops that it is full. Simply knowing how many people are in the elevator and how many are waiting at the elevator lobby in each floor can improve the service dramatically. The advantage is not only in service. Improving the efficiency of elevators can reduce operational and maintenance costs, and may help reduce the number of elevators in new buildings.

Industrial management: Many industrial manufacturing processes have a need for counting or overseeing the manufacturing process of the product. These systems must work with very high speeds and high-resolution photography, to correctly count the various products produced.

Providers of Industrial Sensors:
Omron Corporation (Omron Group).

SUMMARY OF THE INVENTION

According to one aspect of the present invention there is provided a miniature autonomous apparatus for scene interpretation, comprising: image acquisition means; image processing means directly connected with said image acquisition means; memory means connected with said image acquisition means and with said processing means; power supply; and communication means, wherein said processing means comprise: means for determining an initial parametric representation of said scene; means for updating said parametric representation according to predefined criteria; means for analyzing said image, said means for analyzing comprising: means for determining, for each pixel of said image, whether it is a hot pixel, according to predefined criteria; means for defining at least one target from said hot pixels; means for measuring predefined parameters for at least one of said at least one target; and means for determining, for at least one of said at least one target whether said target is of interest, according to application-specific criteria, and wherein said communication means are adapted to output the results of said analysis.

According to one embodiment, the apparatus additionally comprises means for tracking at least one of said at least one target, said means of tracking comprising means for measuring motion parameters of said target.

The image acquisition means may comprises a digital camera, which may be of CMOS type.

The image processing means may comprise a DSP or a FPGA.

According to another embodiment of the present invention, the means for determining an initial parametric representation of said scene comprises means for computing said initial parametric representation from a plurality of acquired images.

The means for computing said initial parametric representation may comprise means for computing an average pixel image and means for computing a standard deviation pixel image from said plurality of acquired images. The means for updating said parametric representation may then comprise means for computing, for each pixel of said parametric representation, a new average pixel value and a new standard deviation value, using the value of a newly acquired pixel and a predetermined weight coefficient. The means for determining whether a pixel is hot may comprise means for comparing the difference between the actual value and the average value of said pixel with the standard deviation of said pixel.

Alternatively, the means for computing said initial parametric representation may comprise means for computing a minimum pixel value image and a maximum pixel value image from said plurality of acquired images. In this alternative, the means for updating said parametric representation may comprise means for computing, for each pixel of said parametric representation, a new minimum pixel value and a new maximum pixel value, according to the value of a newly acquired pixel. According to one embodiment, the maximum difference between said new minimum pixel value and the previous minimum pixel value is 1, and wherein the maximum difference between said new maximum pixel value and the previous maximum pixel value is 1. The means for determining whether a pixel is hot may comprise means for comparing the difference between the actual value and the minimum and maximum values of said pixels.

In yet another alternative, the means for computing said initial parametric representation comprises means for computing an average derivative value image and a standard deviation derivative pixel value image from said plurality of acquired images. In this alternative the means for updating said parametric representation comprises means for computing, for each pixel of said parametric representation, a new average derivative pixel value and a new standard deviation derivative value, using the value of a newly acquired pixel and a predetermined weight coefficient. The means for determining whether a pixel is hot may comprise means for comparing the difference between the actual derivative value and the average derivative value of said pixel with the standard deviation derivative of said pixel.

According to another embodiment of the present invention, the means for defining at least one target comprises means for segmenting said hot pixels into connected components.

According to yet another embodiment of the present invention, the means for measuring predefined parameters comprises means for counting the hot pixels in said target.

According to yet another embodiment of the present invention, the means for measuring predefined parameters comprises means for calculating the circumscribing rectangle of said target.

According to an additional embodiment of the present invention, the means for determining whether said target is of interest comprises means for analyzing said measured predefined parameters according to said application-specific criteria.

According to another embodiment of the present invention, the means for measuring motion parameters comprises means for matching said target with the same target in a previously captured image.

According to yet another embodiment of the present invention, the means for matching comprises means for calculating the geometric centers of gravity of said target in the two images.

In another aspect of the present invention, there is provided a method of scene interpretation, comprising the steps of: determining an initial parametric representation of said scene; updating said parametric representation according to predefined criteria; acquiring an image of said scene; analyzing said image, said step of analyzing comprising the steps of: determining, for each pixel of said image, whether it is a hot pixel, according to predefined criteria; defining at least one target from said hot pixels; measuring predefined parameters for at least one of said at least one target; and determining, for at least one of said at least one target whether said target is of interest, according to application-specific criteria; and outputting the results of said analysis.

According to one embodiment, the method additionally comprises the step of tracking at least one of said at least one target, said step of tracking comprising the step of measuring motion parameters of said target.

According to another embodiment of the present invention, the step of determining an initial parametric representation of said scene comprises computing said initial parametric representation from a plurality of acquired images.

The step of computing said initial parametric representation may comprise computing an average pixel image and a standard deviation pixel image from said plurality of acquired images. The step of updating said parametric representation may then comprise computing, for each pixel of said parametric representation, a new average pixel value and a new standard deviation value, using the value of a newly acquired pixel and a predetermined weight coefficient. The step of determining whether a pixel is hot may comprise comparing the difference between the actual value and the average value of said pixel with the standard deviation of said pixel.

Alternatively, the step of computing said initial parametric representation may comprise computing a minimum pixel value image and a maximum pixel value image from said plurality of acquired images. In this alternative, the step of updating said parametric representation may comprise computing, for each pixel of said parametric representation, a new minimum pixel value and a new maximum pixel value, according to the value of a newly acquired pixel. According to one embodiment, the maximum difference between said new minimum pixel value and the previous minimum pixel value is 1, and the maximum difference between said new maximum pixel value and the previous maximum pixel value is 1. The step of determining whether a pixel is hot may comprise comparing the difference between the actual value and the minimum and maximum values of said pixels.

In yet another alternative, the step of computing said initial parametric representation comprises computing an average derivative value image and a standard deviation derivative pixel value image from said plurality of acquired images. In this alternative the step of updating said parametric representation comprises computing, for each pixel of said parametric representation, a new average derivative pixel value and a new standard deviation derivative value, using the value of a newly acquired pixel and a predetermined weight coefficient. The step of determining whether a pixel is hot may comprise comparing the difference between the actual derivative value and the average derivative value of said pixel with the standard deviation derivative of said pixel.

According to another embodiment of the present invention, the step of defining at least one target comprises segmenting said hot pixels into connected components.

According to yet another embodiment of the present invention, the step of measuring predefined parameters comprises counting the hot pixels in said target.

According to yet another embodiment of the present invention, the step of measuring predefined parameters comprises calculating the circumscribing rectangle of said target.

According to an additional embodiment of the present invention, the step of determining whether said target is of interest comprises analyzing said measured predefined parameters according to said application-specific criteria.

According to another embodiment of the present invention, the step of measuring motion parameters comprises matching said target with the same target in a previously captured image.

According to yet another embodiment of the present invention, the step of matching comprises calculating the geometric centers of gravity of said target in the two images.

DETAILED DESCRIPTION OF PREFERRED EMBODIMENTS

The present invention provides a method and a system that overcome the limitations of existing image capture and interpretation systems. Currently available components are combined, using a novel approach to image analysis, to create a completely autonomous agent that can be placed anywhere, and within minutes learn the scene it observes and begin to perform its required duty, sending to a backend only the final required data. The MAASI of the present invention becomes so cheap that hundreds or thousands can be placed anywhere required, and applications can be devised that were impossible to perform before.

The MAASI of the present invention is a miniature electronic device that includes subunits for image acquisition, image processing, power supply and communication. The image acquisition subunit, image processing subunit, power supply and communication subunits of the MAASI can be integrated using standard, off the shelf devices, or else using devices that are designed specifically to achieve certain improved performance parameters. A MAASI can be built with currently available hardware, once the appropriate type of software and algorithms are installed. MAASI is specifically designed to perform a complete image recognition task. In contrast with other imaging systems, where the functions of image acquisition and image processing are performed by separate physical units, the system of the present invention performs the entire recognition operation in a miniature, encapsulated unit and outputs only the results of its analysis, requiring a virtually zero-width communication channel. The unit optimizes the components towards the specific recognition task, thereby significantly reducing the complexity of the resulting architecture. Consequently, the system is inexpensive, installable instantaneously, applicable to a large variety of applications, and requires no maintenance under regular operating conditions. The size and price of the sensor allow the installation of a large number of units in high density, in close proximity to the objects to be recognized, where only one unit, or a small number of units of existing products could previously be located, at a large distance from the objects to be recognized. This approach ensures better monitoring of the area to be monitored, since the total number of pixels in the MAASIs used, as well as the optical distance to the targets, are a great improvement over the current practice of a single camera, be it with as high resolution as possible, observing the scene from hundreds or thousands of yards away.

System Integration and Packaging

Figure 4:
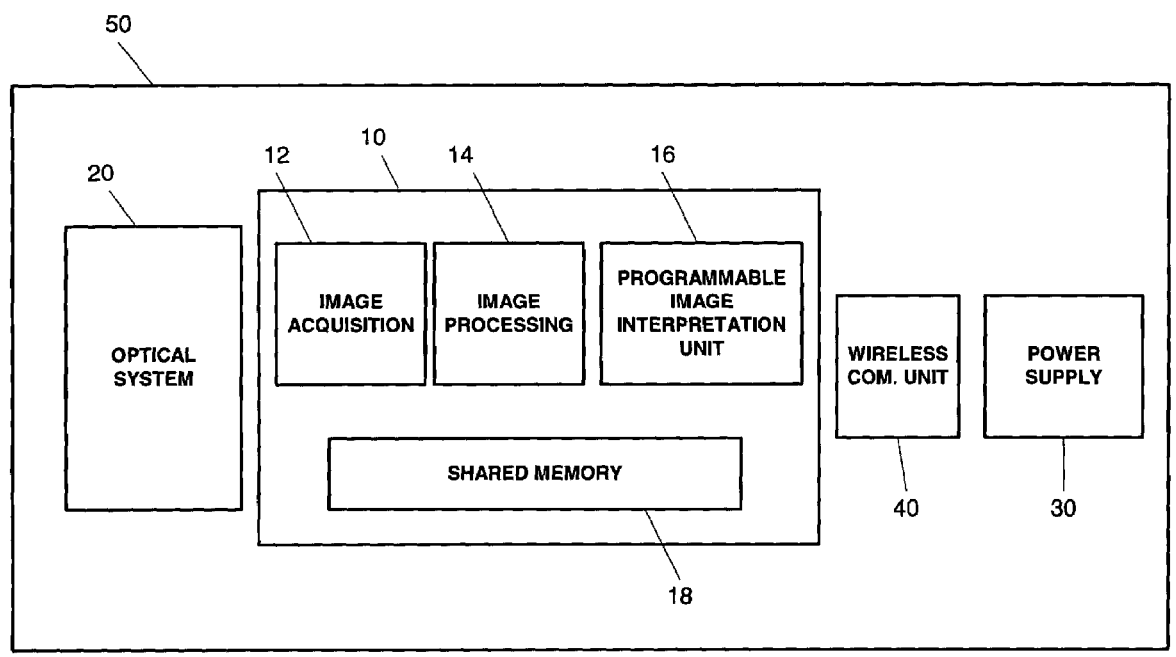
FIG. 4 is a schematic block diagram of the system of the present invention.

FIG. 4 is a schematic block diagram of the system of the present invention, comprising a programmable core recognition engine (CRE) 10, an optical unit 20, power supply 30, wireless communication means 40, and packaging 50.

Figure 1:
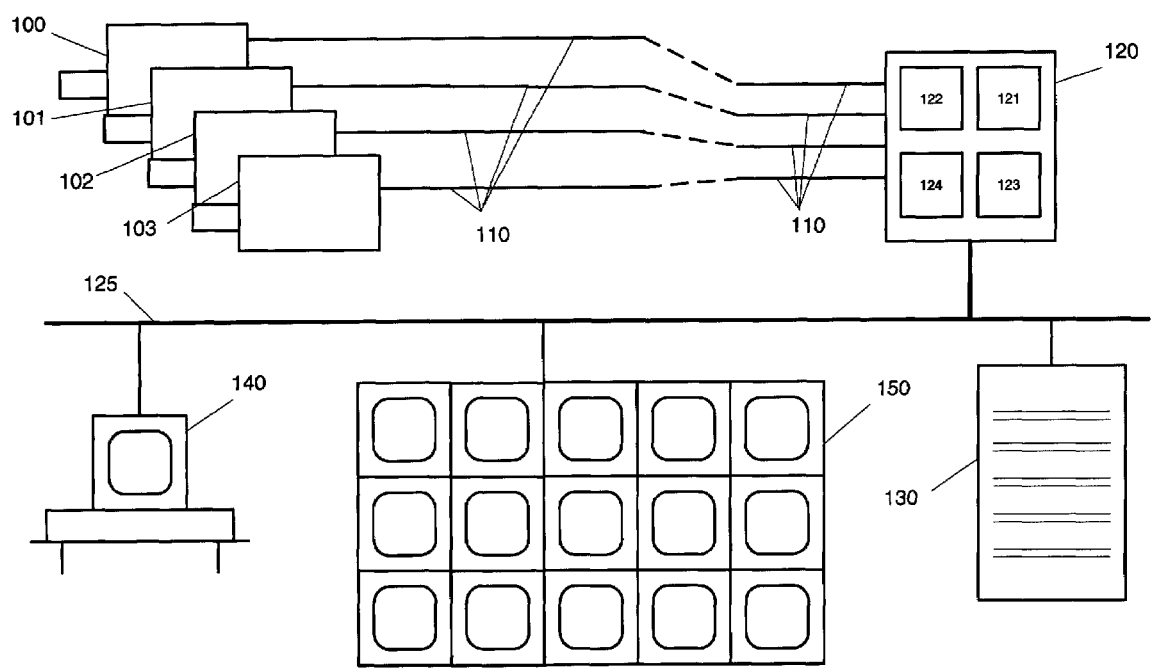
FIG. 1 is a schematic block diagram showing the architecture of existing image acquisition and interpretation systems.
Figure 2:
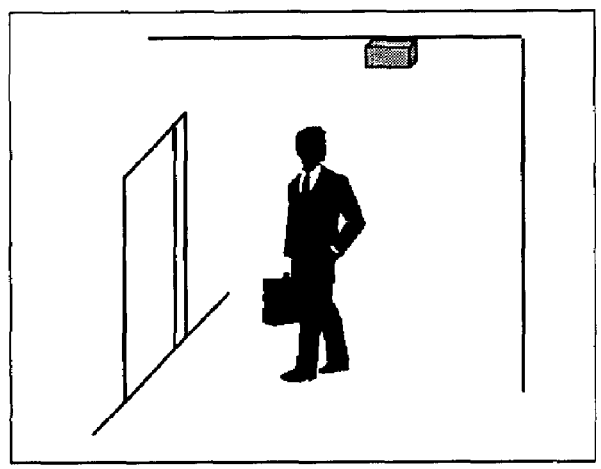
FIG. 2 shows an example of packaging and installing the system of the present invention in an elevator lobby.
Figure 3:
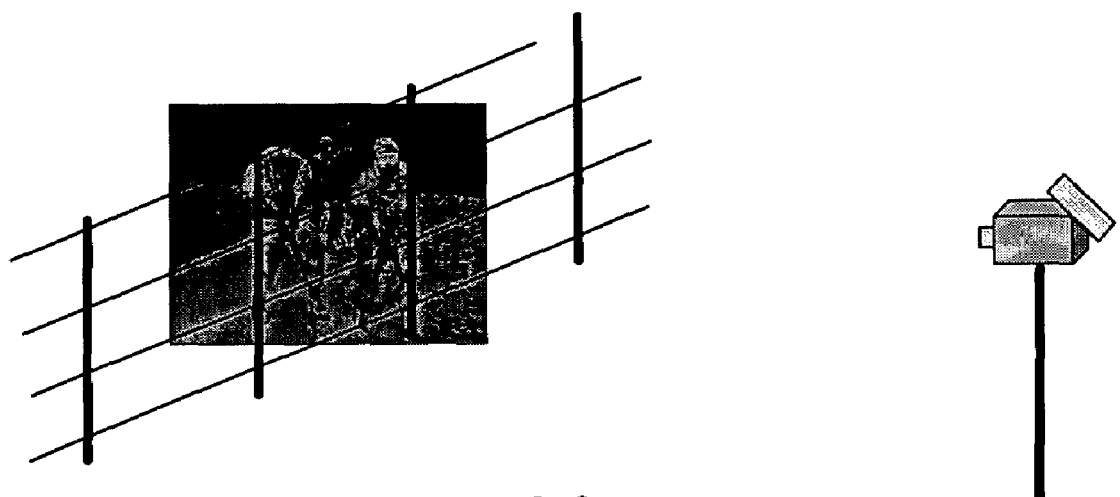
FIG. 3 shows an example of packaging and installing the system of the present invention as a fence security device.

The system may be integrated and packaged per given application. For example, as schematically depicted in FIG. 2, in an elevator lobby the system may be packaged as a 3"×3"× 2" box, equipped with standard indoor illumination optics, installed on the ceiling and fed from the main power supply. In an alternative embodiment, as schematically depicted in FIG. 3, for a fence security monitoring application the system may be packaged to outdoor specifications as a 5"×5"×4" unit, equipped with low-light optics and auxiliary illumination, posted on a 4 feet post and equipped with battery assisted solar power unit.

The wireless communication means may be any means known in the art, such as Cellular: CDMA, GSM, TDMA, Local area networks: 802.11b, 802.11a, 802.11h, HyperLAN, Bluetooth, HOMEPNA, etc.

In a completely autonomous embodiment, the unit has its own power source (solar panel with backup battery), and its own means of indicating the results of its interpretation directly to the user without any backend. For example, a car security application has a MAASI that is required to produce an alert when one of the two front seats is occupied. In this case the output of the MAASI can be directly coupled to a sound alert mechanism. Similarly, a house or shop security MAASI may be coupled directly to an alert mechanism. In more complex applications such as people counting in lobbies, malls, elevator entries etc., the MAASI outputs only the number of people counted in the scene, without any images. In yet more complex applications such as traffic monitoring or fence security, the output from the sensor may be communicated to a PC based station, having a communication interface and running a management and control application, where system operators are visually monitoring the output from the sensors. In such situations the MAASI may be required to communicate images of the scene on top of the interpreted data. Many sensors may communicate with the same station. The MAASI may be required to be capable of transmitting images and/or additional data to the backend, either for regulatory reasons or for further decision-making by a human being or for monitoring an area following the raise of an alert. Nevertheless, this does not render MAASI similar to any of the prior art devices, since it is capable of autonomous operation and is able to perform the entire image recognition/interpretation task on its own, even though it has a backend and may communicate to it data in addition to the results of its predetermined task.

Core Recognition Engine (CRE)

The CRE 10 (FIG. 4) comprises four functional components: image acquisition module 12, preprocessing module 14, image interpretation module 16, and shared memory 18. Physical electronic device boundaries do not necessarily match the functional breakdown. For example, some preprocessing elements may be a part of the camera chip. Alternatively, a single chip may contain the entire image acquisition and preprocessing units.

Camera—Image Acquisition module 12: In a preferred embodiment, the camera is a CMOS gray-level camera with built-in control functions, at 8-bit QVGA resolution (320×234), automatic gain control and configurable variable frame rate. Clearly these parameters should be optimized for a specific application. For example, the resolution can be increased, or, more often, decreased, sometimes drastically. In some applications a VGA resolution of 640×480 is required, while in others a resolution as low as 40×60 is capable of producing good results. The output is an 8 bit stream of pixel data at a frame rate that is determined by illumination conditions and analysis throughput limits. The camera may alternatively be based on any digital photography technology known in the art, such as CCD. The advantages of a CMOS camera are its relatively low cost and the potential of integration of analysis modules into the camera chip. The camera controls include exposure control and frame-rate control.

Preprocessor 14: The preprocessor performs an image-processing task as required by the application specific to a given MAASI. Since the MAASI is an autonomous unit that is meant to be deployed at a much higher spatial density (MAASI units per unit area or length) than customary surveillance devices, it must be low cost. Thus, the preprocessor is preferably an off-the-shelf electronic signal processor, of the type of a DSP or alternatively an FPGA, whose cost is below $10. Because of the demand for low cost, the optimization of the components in the MAASI is crucial. Thus, the choice of preprocessor hardware is related to the choice of camera, its output rate, frame size, frame rate, pixel depth, signal to noise etc. Examples of suitable DSP type processors are—Motorola 56800E and TI—TMS320VC5510—. Another example is a CPU type processor such as—Motorola: Dragon Ball—MX1 (ARM9),—Motorola: Power PC—PowerQuicc 74xx (Dual RISC), or—Hitachi: SH3 7705

The image acquisition unit 12 and the preprocessor 14 are pre-configured with parameters regarding the required application, including illumination parameters, detection parameters, motion parameters and so on, as detailed below. Thus, the update rate of the parametric reference image and the parameters for alert definition based on motion parameters, are preconfigured in the system.

Algorithm and integration: In order for the image acquisition, image processor and analysis algorithm to be able to perform their required duty, two main points must be observed. First, the output of the image acquisition device must be matched to the processing capabilities of the processor. Second, the performance of the image-processing algorithm must be matched to the capabilities of the processor, in terms of available memory, processing rate etc. on the one hand, and to the image acquisition device in order to be able to process the required rate of data output from that device.

To be specific, every application has its own minimal requirements for frame size, frame rate and pixel depth. Thus, for a car security application that is required to determine if one of the front two seats is occupied, a frame size of 60×30 and a frame rate of 1 frame per second (fps) may be entirely sufficient. For a traffic monitoring application, minimal frame rate of about 10 fps is required, and the frame size depends on the distance between the MAASI and the road. With MAASI, the units will be placed 10-20 meters from the road, and about 50 meters apart. This means that the frame size can be as small as 352×288(CIF), which results in a pixel rate of 352×288×10=1,013,760 pixels per second. This is in contrast with the standard video rate of about 30 million pixels per second. In spite of the small frame size, comparison of a network having an MAASI every 50 meters with a high-end camera every mile shows that the network solution provides more pixels per meter, brings the monitors closer to the scene, is less liable to be confused by weather conditions, is less expensive, and will provide much better information about traffic, fence security, rail security and every other large scale application.

The algorithm that performs the image processing must be developed to the following requirements: 1. It should be able to adapt to varying illumination levels; 2. It should be able to disregard slow and standard changes in the scene; 3. It should be able to detect new objects in the scene; 4. It should be able to classify the new objects by their basic shapes; and 5. It should be able to count the objects, determine their speed or perform any further processing as required by the application.

Such algorithms operate basically in two steps: First, there is the low level operation that analyzes all input pixels and outputs a list of the new objects. This part is common to all applications. Second, there is the application-specific analysis of the objects to determine whether an alert is due, or to count the objects or measure their velocity etc. The first, low-level part of the algorithm is relatively heavy in terms of processing needs, since each and every pixel must be processed. The second part is usually cheap in terms of computation, although it can be based on intricate algorithms and software. This is so since what must be processed is a short list of objects. Thus, when matching or adapting an algorithm to the MAASI, the design of the low-level part of the algorithm is critical and should ensure that it can handle the incoming pixel rate. Several examples of such low-level algorithms are disclosed below. We shall also describe some examples for second stage processing, but we claim no novelty on such type of algorithms.

As far as the low level processing algorithms are concerned, it should be noted that such a class of algorithms has not been mentioned before in the literature, since the concept of an MAASI is novel. In this disclosure we show several ways in which algorithms for object extraction can be developed that have low memory requirements, and are efficient in that they process each pixel only a small number of times.

Image Processing Algorithms

Figure 5:
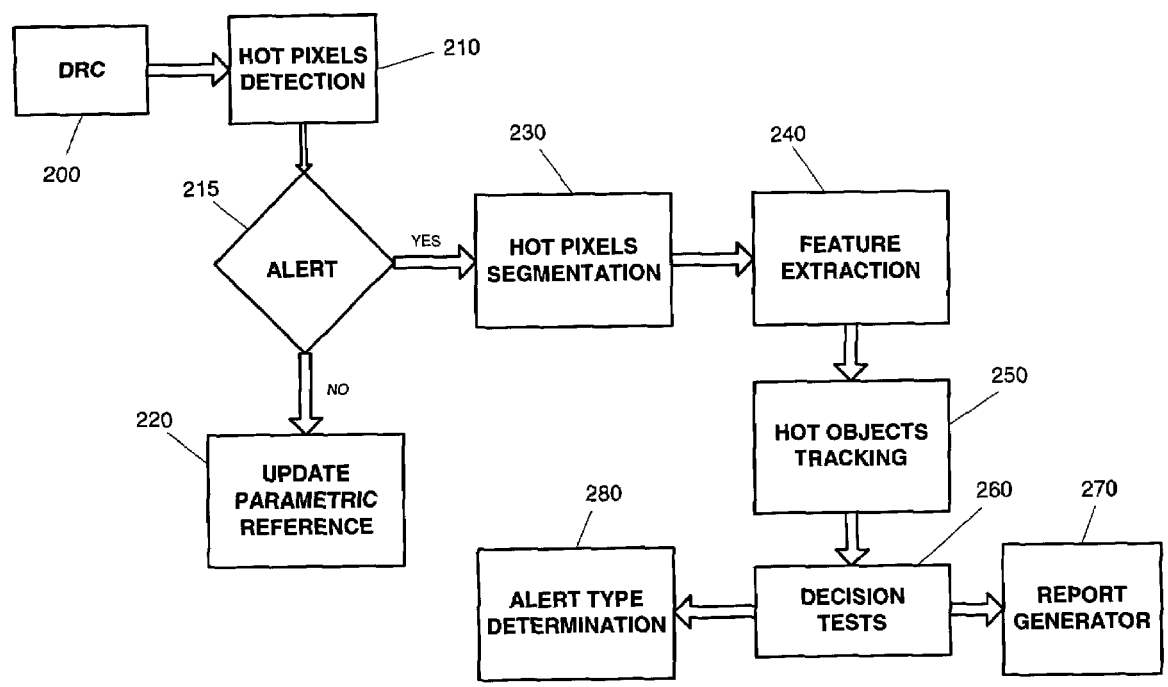
FIG. 5 is a general flowchart showing the sequence of algorithms applied to the acquired images according to the present invention.

Several image-processing algorithms are used by the MAASI. Each of them can be designed in several different ways. The requirements for each type of algorithm are specified below and several examples for implementation are provided. FIG. 5 is a general flowchart showing the sequence of algorithms applied to the acquired images.

Dynamic range control (DRC algorithm). The DRC algorithm 200 is required in order to adapt the general amount of light energy captured by the camera and match it to the sensitivity of the sensor. Control of the dynamic range can be effected by changing the shutter speed (electronically on the camera chip), and/or control of a diaphragm if one is installed, and/or turning on/off auxiliary illumination. The DRC algorithm is sometimes a built-in part of the camera chip. In other cases, the camera chip can perform the required control but determination of the level is external. In preferred embodiments of the present invention the DRC algorithm is able to communicate with the hot pixel detection algorithm 210 (see below), so that when dynamic range is changed, the hot pixel algorithm can adapt itself to the new setting. DRC algorithms are relatively well known. Usually a histogram of all or part of the image is computed and both ends of the histogram are determined, say as a fixed percentage of the total pixel count. According to the values of these numbers, a decision is made whether to keep the dynamic range, increase it or decrease it. This operation may be performed only once in a while, say once every minute or so, to minimize disturbance to the detection algorithm. A dynamic range of at least 1:10000 is required to allow operation at all illumination conditions, except near complete darkness.

Detection algorithm. For the purposes of this discussion we consider detection algorithms as preferably consisting of two distinct steps: low-level detection and high-level detection. We consider the low-level detection algorithm to perform pixel-based detection and detect suspect, or hot pixels; this step is preferably application independent. The high-level detection takes as input the list of hot pixels and applies application-specific processing to them—segmentation, blob detection, tracking, template matching etc. In the discussion that follows we keep to this distinction between the pixel-based detection and the high-level detection. Naturally, one could choose to consider the two parts as integrated, or draw the line separating the two units in a different place (for example after blob analysis) or chunk it up into a different number of parts, without loss of generality and under the scope of the claimed invention.

Low-level detection 210. Low-level detection in the system of the present invention involves identification of "hot pixels". Thus, the processing is assumed to be performed per pixel. This is, therefore, the most processing-expensive part of the operation. The next parts are less expensive, since the data is a list of a small number of objects. In any case the number of hot pixels is smaller, usually much smaller, than the total number of pixels. Thus, in this part it is very important that the algorithm be as efficient in terms of both complexity of computation and memory requirements. Any algorithm for hot pixel detection that is part of an MAASI must fulfill the requirements set up above for automatic learning of the scene, automatic adaptation for changing illumination and for slow changes. Any algorithm that fulfills these requirements and has reasonable computational complexity and modest memory requirements will do. We show here by way of example several approaches to the hot pixel learning and detection algorithm (HPLD algorithm). For the ensuing discussion, denote by N is the number of pixels in the frame.

1. Average/variance HPLD. In this algorithm the parametric reference image includes two values for each pixel: average value and standard deviation value. Thus two images are stored and subsequently updated, an average value image and a standard deviation value image. An incoming current pixel is compared to these values and a decision is taken whether it is to be categorized as hot or as cold. The details of the computation are as follows:

1.1. Learning step: In this step the parametric reference image is constructed. Two images are computed, AvImage (every pixel contains the value of the average pixel) and stdImage (every pixel contains the standard deviation of that pixel). In order to compute these two images with low computational cost, the following is performed. Three counters, sum, sumG and sumGG are set for every pixel and initialized to zero. Then, an appropriate number of frames is collected. For every frame, for every pixel with grey level G, the counters are updated as follows:

$$\text{sum}+=1,$$

$$\text{sum}G+=G,$$

$$\text{sum}GG+=G*G.$$

Once the predetermined number of frames has been collected, the values of AvImage and stdImage are computed as follows, for every pixel:

$$\text{average}=\text{sum}G/\text{sum},$$

$$std=(\text{sum}GG/\text{sum}-(\text{sum}G/\text{sum})^2)^{1/2}.$$

In this way, the average pixel image and the standard deviation image are computed with N operations (single pass) and 3N memory requirement, which is provably minimal.

1.2. Detection step: for every pixel, decide if it is hot or cold: denote by $G_i$ the value of pixel i in the current frame, $Av_i$ value of pixel i in avImage, $Std_i$ the value of pixel i in stdImage. Then pixel i will be marked as "hot" if and only if $|G_i-Av_i|>Std_i$.

i. For every frame, decide if it has a potential alert or not (215) by comparing the number of alert pixels to a predetermined threshold.

ii. If the image has no alert, update avImage and stdImage (220). This is where the parametric reference is updated to keep track of slow changes in the scene, including illumination changes. The update procedure is as follows: an update factor q is predetermined. The parameter q must be a value between 0 and 1. The update rule is as follows: given a pixel $G_i$ in the current frame and the current values of $Av_i$—the value of pixel i in avImage, $Std_i$—the value of pixel i in stdImage, the update rule is:

$$\text{new } Av_i=q*Av_i+(1-q)*G_i \qquad \text{a.}$$

$$\text{new } Std_i=(q*Std_i^2+(1-q)*(G_i-Av_i))^{1/2} \qquad \text{b.}$$

These computations can easily be implemented as a table lookup and so require a single pass over the pixels.

iii. If the image has an alert, then the alert image (binary image where 1=hot pixel and 0=cold pixel) is sent to interpretation (230) which will be detailed below.

2. Min/max HPLD. In this algorithm the parametric reference image includes two values for each pixel: minimum value and maximum value. Thus two images are stored and subsequently updated, a maximum value image and a minimum value image. An incoming current pixel is compared to these values and a decision is taken whether it is hot or cold. The details of the computation are as follows:

2.1. Learning step: In this step the parametric reference images are constructed. Two images are computed, minImage (a pixel contains the minimal value observed on this pixel) and maxImage (a pixel contains the maximal value observed on this pixel). It is easy to compute these values. Initially, every pixel in maxImage is set to the minimal possible value (usually zero). Similarly, every pixel in minImage is set to the maximal possible value (usually and preferably, the images are 8 bits images and so this value is 255. Other bit depths can be used if required, such as 9 bits, 10, 11, 12 or 16, where the maximal values are 511, 1023, 2047 and 65535, respectively). For every incoming frame, and for every pixel, the value of the incoming pixel is compared with the values of minImage and maxImage and these values are simply updated in the following way:

newMax=max(oldMax, currentPixel), newMin=min(oldMin, currentPixel).

Once the predetermined number of frames has been collected, no further processing is required and the parametric images are ready. In this way, the maximal pixel image and the minimal pixel image are computed with O(N) time and O(2N) memory requirement, which is provably minimal.

2.2. Detection step: for every pixel, decide if it is hot or cold: denote by $G_i$ the value of pixel i in current frame, mini value of pixel i in minImage, $max_i$ the value of pixel i in maxImage. Then pixel i will be marked as "hot" if and only if $G_i$>$max_i$ or $G_i$<$min_i$.

i. For every frame, decide if it has a potential alert or not (215) by comparing the number of alert pixels to a predetermined threshold
  ii. If the image has no alert, update maxImage and minImage (220). This is where the parametric reference is updated to keep track of slow changes in the scene, including illumination changes. The update procedure is as follows: for a pixel $G_i$ in the current frame, if the corresponding value in minImage is mini, then the update rule is a. If $G_i$>=$min_i$, than set newMin$_i$=oldMin$_i$+1(unless oldMin$_i$ is already at maximum value, in which case leave it as it is).

b. If $G_i$<$min_i$, than set newMin$_i$=oldMin$_i$-1(unless oldMin$_i$ is already at minimum value, in which case leave it as it is).

The update rule of the maximum value is constructed with the self-evident symmetric logic.

In a preferred embodiment, the updating of the minimum and maximum values is performed for each frame. In another preferred embodiment, the update rule is performed after a predetermined time has elapsed. This can be equal to the frame time or larger than that. In yet another embodiment, the update frequency is related to the amount of deviation between the value of the current pixel and the value of the min/max thresholds. For example, if a pixel has value=200 and the corresponding maximum is=100, then it is reasonable to update the threshold sooner than if the value of the pixel is 101. The choice of appropriate logic is dependent on the application and optimized with respect to the detection/false alarm ratios observed.

These computations can easily be implemented as a table lookup and so require a single pass to complete.

iii. If the image has an alert then the alert image (binary image where 1=hot pixel and 0=cold pixel) is sent to interpretation (230 through 280). This will be detailed below.

3. Derivative HPLD. In this approach every incoming image undergoes a preliminary step of computation of the derivative. This is useful in particular when images with high dynamic range are required while memory constraints demand minimal storage space. The derivative for every pixel is computed with the following computation:

$$D_i = F_k \cdot ((G_R - G_L)^2 + (G_B - G_T)^2)^{1/2},$$

where $G_R, G_L, G_B$, and $G_T$ are the pixels immediately to the right, left, bottom and top of the current pixel, respectively.

This can be easily computed with a lookup table. Alternatively the derivative can computed as $$D_i = F_k \cdot \max(abs(G_R - G_L), abs(G_B - G_T)).$$

If the derivative turns out to be bigger than the maximum allowed value, it is trimmed to that value. The normalization factor $F_k$ is chosen to maximize the usage of the dynamic range of the pixel buffer. This is since derivatives are usually very small. Thus the normalization factor $F_k$ often has a value larger than 1, for example 4 or 8. Once a frame has been transformed from raw image to derivative image, its handling can continue preferably with one of the two algorithms described above. As an example without limiting the scope of this approach, we will describe the use of the derivative approach with the average/standard deviation algorithm above.

3.1. Learning step: In this step the parametric reference image is constructed. Two images are computed, AvDImage (every pixel contains the value of the average derivative for this pixel) and stdDImage (every pixel contains the standard deviation of the derivative for that pixel). As before, three counters, Dsum, DsumG and DsumGG are set for every pixel and initialized to zero. Then, an appropriate number of frames is collected. For every frame, and for every pixel with derivative value DG, the counters are updated as follows:

$D$sum+=1, $D$sum$G$+=$DG$, $D$sum$GG$+=$DG*DG$.

Once the predetermined number of frames has been collected, the values of AvDImage and stdDImage are computed as follows, for every pixel:

$D$average=$D$sum$G$/$D$sum, $D$std=($D$sum$GG$/$D$sum-($D$sum$G$/$D$sum)$^2$)$^{1/2}$.

In this way, the average derivative image and the standard deviation derivative image are computed with a single pass and 3N memory requirement, which is provably minimal.

3.2. Detection step: for every pixel, decide if it is hot or cold: denote by $DG_i$ the value of the derivative of pixel i in current frame, $DAv_i$ value of the derivative of pixel i in avDImage, $DStd_i$ the value of the derivative of pixel i in stdDImage. Then pixel i will be marked as "hot" if and only if $|DG_i - DAv_i| > DStd_i$ i. For every frame, decide if it has a potential alert or not (215) by comparing the number of alert pixels to a predetermined threshold.
  ii. If the image has no alert, update avDImage and stdDImage (220). The update procedure is similar to that shown above: given a derivative value of a pixel $DG_i$ in the current frame and the current values of $DAv_i$—the value of the derivative of pixel i in avDImage, $DStd_i$—the value of the derivative of pixel i in stdDImage, the update rule is:

a. new $DAv_i = q*DAv_i + (1-q)*DG_i$ b. new $DStd_i = (q*DStd_i^2 + (1-q)*(DG_i - DAv_i))^{1/2}$ These computations can easily be implemented as a table lookup and so require a single pass.

iii. If the image has an alert then the alert image (binary image where 1=hot pixel and 0=cold pixel) is sent to interpretation (230 through 280). This will be detailed below.

Anyone skilled in the art of developing algorithms for image processing will appreciate that the examples detailed above are in no way limiting the scope of the invention where this type of algorithm can enable a complete scene interpretation system to be operated on a simple and cheap processing unit attached directly to a low cost camera. There are numerous variants of these algorithms including, but not limited to: using the time derivative instead of the spatial derivative; separating the directional derivatives and applying the algorithm to each separately; applying various heuristics for threshold updating, including intermittent updates, random updates, brightness sensitive update; various heuristics for changing the values of the thresholds, either by a predetermined step or by an adaptive step; various heuristics for determining the different factors associated with the algorithm and so on.

Image segmentation and interpretation algorithms. The next part in the processing is higher level but still application independent. In this part the hot pixels are segmented into connected components (230). The hot pixel image is built of a 1-bit image where 1 corresponds to a hot pixel and 0 to a cold pixel. A standard connected component labeling procedure is now performed on this image. This operates in two runs, and therefore requires two passes over the image pixels. In the first run, a hot pixel is temporarily labeled according to its neighborhood. If the pixel is already a neighbor of a labeled pixel then it receives the same label. If it is the neighbor of no previously labeled pixel then it receives a new label. If it is the neighbor of several labeled pixels, not all of whom have the same label, then an interconnection table is updated to indicate that all these labels are the same, and the current pixel is labeled by the lowest of these labels. In the second run, the interconnection table is used to correct the pixel labeling so that all the pixels in a connected neighborhood have the same label.

FIGS. 6A to 6D present an example of the above calculation.

Figure 6A:
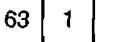
FIGS. 6A through 6D are an example of a hot-pixels segmentation calculation.

In FIG. 6A, pixel C is the current pixel and pixels 1 through 4 are "historic" pixels that have already been labeled (if they were marked as "hot", or left as zero otherwise.

Figure 6C:
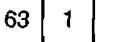
Figure 6B:

FIG. 6B shows the case where the current pixel is "hot", but has no pre-labeled neighbors. The hot pixel gets a new label ID 63.

FIG. 6C shows the case where some of the current pixel's neighbors have been pre-labeled, all with the same ID. The current pixel is also labeled with the same ID.

Figure 6D:

FIG. 6D shows the case where some of the current pixel's neighbors have been pre-labeled, but with different Ids. The current pixel is labeled with the lowest label ID and an interconnecting table is updated to indicate that the two labels relate to the same segment.

During this second run of the segmentation step (FIG. 5, 240), important information is collected on the labeled component: how many pixels it contains, and what are the parameters of the circumscribing rectangle (maximal and minimal x, maximal and minimal y). Additional parameters can be computed from these basic ones: aspect ratio of the segment (height/width) and fill ratio (number of pixels/area of circumscribing rectangle). The end result of this processing is a list of segments, or objects, each with its measured properties. A member of this list can henceforth be called a "hot object".

Hot object tracking (250). At this stage in the processing we are left with a list (often a relatively short list) of objects that have been combined from hot pixels. We can match the list of hot objects arising from the current frame with objects arising from previous frames. In fact, we can hold a track record of hot objects that will assist us in identifying required properties of these objects. In some situations the history of an object, or at least the path it traversed, is important for discriminating between an interesting event and an uninteresting one. For example, in a security application, it is important to distinguish between a person innocently passing a track, and one who stops on the track, perhaps to deposit some suspicious object. In such a case the motion record of the object will enable the appropriate decision to be taken. Thus, in order to track objects, in our special setting of minimal computational resources and minimal memory resources, we must use an algorithm that is very simple and low cost. Naturally, different algorithms will be optimal for different applications. For example, a security application will require a different algorithm than that of people counting for elevator management systems.

For the security application, tracking can be very important. This implies a specific frame rate and field resolution. Tracking can be superfluous for many applications, such as people counting for elevator management. In other applications, a very simple tracking procedure can be used. An object from the current frame can be matched to a previous object on the basis of geometric proximity of the center of gravity of the objects. In this simple procedure the center of gravity of each hot object is computed during its process of segmentation by the following method: set three counters, N, Sx, Sy to zero; for every pixel Px, Py in the blob (segment), increment the counters by $N$++, $Sx$+=$Px$, $Sy$+=$Py$;

finally compute the COG by $COGx=Sx/N$, $COGy=Sy/N$.

With these COG values, very simple tracking can be obtained by subjecting these coordinates to nearest neighbor clustering techniques. This is useful for cases with low expected number of objects moving at low to medium rates. More complex strategies can be employed. Since the number of objects is small, it is not a problem to implement even relatively complex algorithms since the dataset is so small. For example, in an application for traffic control, a larger number of objects is detected by the system continuously. However, there is an average speed more or less used by all vehicles on the road. This makes it easy to perform object matching while keeping the object order monotonous and not switching them. A simple sorting procedure will allow to pinpoint the correct matching in this application. Once the matching phase is completed, the history of an object can be tracked. The parameters extracted from this tracking are application dependent. For example, in a security application that is required to produce an alert when a hot object becomes static in the frame for more than 3 seconds, a pipeline holding the object's location over the last 3 seconds should be held. In this pipeline, supposing a frame rate of 10 frames per second, 30 pairs of x,y coordinates are held. We can denote them by $(x_1,y_1), \ldots, (x_{30},y_{30})$. The image plane distance covered by the object over the last 30 seconds is given by $\max(|x_{30}-x_1|, |y_{30}-y_1|)$. When a new frame comes along, the pipeline is rotated so that $(x_1,y_1)$ is discarded, $(x_2,y_2)$ becomes $(x_1,y_1)$, $(x_3,y_3)$ becomes $(x_2,y_2)$, and so on, until $(x_{30},y_{30})$ becomes $(x_{29},y_{29})$ and the new location (x,y) becomes $(x_{30},y_{30})$. In this simple way the identification of a static object can be achieved.

Alert Analysis (Post-Processing)

The input to this stage is a list of segment features of the type discussed above. These allow to filter-out "uninteresting" alerts, such as, for example, luggage (in a lobby application), pets (in a mall application), pig/cow in outdoor surveillance application, or weather artifacts (in an outdoor application). The extracted features are used in a decision algorithm (260, FIG. 5), to decide whether there are alert elements in the image, and if so how many. This drives the report generator 270, which generates the report that will be communicated out. In some cases, the entire image may be communicated. This can be as a result of automatic alert detection by the algorithm or by proactive request of a system operator.

In order to enable the system to obtain the correct decision of the scene status numerous tests are applied. In this part we shall disclose a few example tests but the person skilled in the art of algorithms for computerized surveillance systems will appreciate that there are many additional tests that may be suitable in particular circumstances.

1. Segment size and structure tests: these are very simple and basic tests. A segment whose size (circumscribing rectangle) is small (for example, width<8 pixels, height<10 pixels, area<15 pixels) is discarded. Similarly, a segment where the number of pixels is smaller than a threshold, for example threshold=20, is discarded. The threshold depends on the application and the acquisition device. Another basic test is the fill ratio: number of pixels in the segment/area of circumscribing rectangle. If this is smaller than, say, 0.2, then it is unlikely that this is an ordinary object such as a person or a car, and could be a shadow or a light glimmer or a moving tree.

2. Correlation test: in many cases elements of the scene may change their brightness quickly. For example, a wet road in a rainy day can become very bright when the sun comes out between the clouds, and become quickly dark when the clouds cover the sun. However, the overall reflectance pattern of this piece of the scene remains relatively constant. Thus, if a rapid change in brightness has caused the MAASI to detect a part of the road as a potential alert, this test could show that it is in fact a change in illumination. To compute the correlation with low computational cost, the following procedure is used: Initialize 7 counters to zero: Sx, Sy, Sxx, Syy, Sxy, nTotal, nOF; For every pixel:

if it saturated (near the high or low limit of pixel values), increment nOF+=1;

else:

set y=average value of parametric reference image (or average of min/max when this algorithm is used);

set x=value of current pixel in the segment;

compute $$Sxx+=x*x; \quad Sxy+=x*y; \quad Syy+=y*y; \quad Sx+=x;$$
$$Sy+=y; nTotal++;.$$

Once all segment pixels have been analyzed, compute the correlation by corr=(Sxy−Sx*Sy/nTotal)/sqrt((Sxx−Sx*Sx/nTotal)*(Syy−Sy*Sy/nTotal). The use of this test is as follows: if the correlation is better than 0.7 (for example), then this is an illumination change and not an alert. A more complex decision can be based on the number of overflow pixels and on additional values such as the segment size.

3. Fractality test: in this test the segment is studied for smoothness. This means that the ratio between the number of segment pixels and the number of edge pixels in the segment is computed. An edge pixel of a segment is any pixel that touches a non-segment pixel. It is important to note that in small segments, it is reasonable to expect a large number of the pixels to be edge pixels. For example, in a segment whose width is two pixels, all the pixels will be edge pixels. Thus, in order to take this into account, a computation of the number of reasonable edge pixels out of the total number of pixels is required. An example for such an estimate is $$maxAllowedEdgePixels=max(numTotal/4,2*sqrt(numTotal)),$$

where numTotal is the total number of pixels in the segment. With this estimate, a segment will be considered "fractal" if the number of edge pixels is larger than maxAllowedEdgePixels.

Figure 7A:
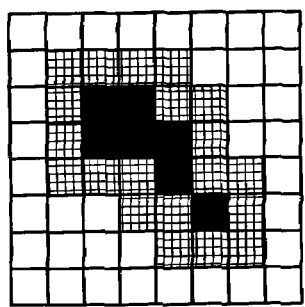
FIGS. 7A through 7C show examples of different segments and their edge pixels, as used by the fractality test according to the present invention.
Figure 7B:
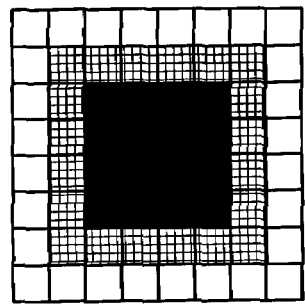
Figure 7C:
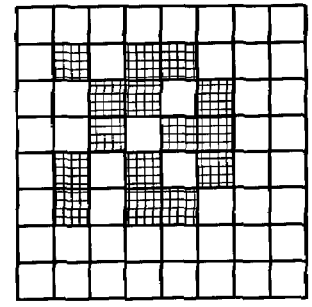

FIGS. 7A through 7C show examples of different segments and their edge pixels. Edge pixels are denoted by a thatched pattern; inner pixels are filled with solid gray. In the segment of FIG. 7C all pixels are edge pixels.

4. Edge test: In many cases, poles or trees or other vertical objects are found in the scene. As the sun moves, the shadows of these objects move along the scene and can create false alerts. One property of these alert segments is that a large number of the hot pixels are also edge pixels, in the sense that a large spatial derivative exists at that pixel because it lies on the boundary between light and dark. To distinguish such false alerts, an evaluation of the spatial derivative at each segment pixel is performed. This is done by computing $$xDeriv=abs(pix[x+1,y]-pix[x-1,y]);$$

$$yDeriv=abs(pix[x,y+1]-pix[x,y-1]);$$

$$deriv=\max(xDeriv, yDeriv);$$

compare this deriv value to the value by which pix[x,y] has deviated from the allowed range for this pixel; if the deriv value is larger, then this is an edge pixel. Once the number of edge pixels is determined, the ratio between this number and the total number of pixels in the segment can be used to decide if the alert is real or false.

5. Motion detection for traffic control. For this application, once the objects of interest have been determined, a list L with the coordinates x,y of their centers of gravity can be produced. It can be assumed that traffic on a road either is heavy, in which case the speed is similar for all vehicles, or else it is light, in which case the number of vehicles is small. It can also be assumed that the identification of the sense of motion (to the right or to the left) is known. It can also be assumed that these parameters—light/heavy traffic, average speed, and motion sense are known by the algorithm prior to analysis of the current frame. The algorithm requires the list $L_c$ for the current frame as well as the list $L_p$ of the previous frame. In the case of light traffic, there are few objects in the image and it is not difficult to match by using nearest neighbor approach, combined with knowledge of the sense of motion and with the additional assumption that cars do not bypass (even if some bypasses are observed, the end result of the computation for average speed and number of cars is negligible). In the case of heavy traffic, the initial estimate for vehicle speed can be used to update $L_p$ values and bring them very near to the values for $L_c$. Again, nearest neighbor approach works well now because the uncertainty distance for matching is very small. At this stage, new cars that enter the image (from the left, for example) can be taken into account. The speed can be recomputed and saved for later use. The speed is computed in terms of pixels per second, and should be normalized to reflect the (constant) optical parameters of the MAASI and distance from the road.

6. Alert types (FIG. 5, 280). In this section we show an example of how the different alert types and tests can be used to determine the type of alert produced. It is obvious that determining an alert type is specific for a given application, and numerous algorithms can be devised to produce the required result.

a. If segment is too small, or too thin, or too fractal, or has and edge—type=ALERT_NONE.
b. If segment is very large, and covers nearly the entire image—type=ALERT_FULL (can mean that someone tinkered with or covered the MAASI)
c. If segment is in basically the same position for more than 3 seconds—type=ALERT_STATIC (can be very important in security applications)
d. If segment is much wider than its height and its location is in the lowest part of the image—type=ALERT_ANIMAL
e. If the number of alert segments is greater than 1—type=ALERT_MULTIPLE Clearly, the types of tests, their parameters and the decision logic can be changed to perform optimally for the required application. We also disclose here that the number, types, locations in the image, time of day, and duration—can all be collected and used as a further learning algorithm that over the duration of several days becomes accustomed to alerts that repeat at given times and image coordinates. This method can be used to further reduce false alarms, as can do numerous other methods known in the art or constructible by anyone skilled in the art of algorithm design for computerized surveillance and image processing applications. Such algorithms must be subject to the same considerations as the algorithms disclosed above—low cost of computation, low memory consumption, and high usability and reliability.

Once the appropriate alert type has been determined, a report generator (270, FIG. 5) packs it and sends it through the communication channels.

The invention claimed is:

1. A miniature autonomous apparatus for scene interpretation, comprising:
   a digital camera for producing an image of a scene; and
   a processor associated with said camera, said processor adapted to run at least a dynamic range control process and an image processing detection process, wherein the image detection process includes at least a first process for assigning for each received pixel a pixel type out of a plurality of possible pixel types, and wherein at least pixels of a first pixel type are further processed according to at least a second process not performed upon pixels with different types; and
   wherein the dynamic range control process is adapted to change the dynamic range settings of the camera, and is in communication with the image processing detection process such that when dynamic range is changed, the image detection process adapts itself to the new dynamic range setting;
   wherein the processor is configured to:
      determine an initial parametric representation of said scene including compute at least an average pixel image and a standard deviation pixel image from said plurality of acquired images;
      update said parametric representation according to predefined criteria;
      analyze pixels of said image so as to determine which of said pixels are hot pixels, according to predefined criteria;
      define at least one target from said hot pixels;
      measure predefined parameters for at least one of said at least one target; and
      determine for at least one of said at least one target whether said target is of interest, according to application-specific criteria.

2. A miniature autonomous apparatus for scene interpretation, comprising:
   a digital camera for producing an image of a scene; and
   a processor associated with said camera, said processor adapted to run at least a dynamic range control process and an image processing detection process, wherein the image detection process includes at least a first process for assigning for each received pixel a pixel type out of a plurality of possible pixel types, and wherein at least pixels of a first pixel type are further processed according to at least a second process not performed upon pixels with different types; and
   wherein the dynamic range control process is adapted to change the dynamic range settings of the camera, and is in communication with the image processing detection process such that when dynamic range is changed, the image detection process adapts itself to the new dynamic range setting;
   wherein the processor is configured to:
      determine an initial parametric representation of said scene including compute at least a minimum pixel value image and a maximum pixel value image from said plurality of acquired images;
      update said parametric representation according to predefined criteria;
      analyze pixels of said image so as to determine which of said pixels are hot pixels, according to predefined criteria;
      define at least one target from said hot pixels;
      measure predefined parameters for at least one of said at least one target; and
      determine for at least one of said at least one target whether said target is of interest, according to application-specific criteria.

3. A miniature autonomous apparatus for scene interpretation, comprising:
   a digital camera for producing an image of a scene; and
   a processor associated with said camera, said processor adapted to run at least a dynamic range control process and an image processing detection process, wherein the image detection process includes at least a first process for assigning for each received pixel a pixel type out of a plurality of possible pixel types, and wherein at least pixels of a first pixel type are further processed according to at least a second process not performed upon pixels with different types; and
   wherein the dynamic range control process is adapted to change the dynamic range settings of the camera, and is in communication with the image processing detection process such that when dynamic range is changed, the image detection process adapts itself to the new dynamic range setting;
   wherein the processor is configured to:
      determine an initial parametric representation of said scene including compute at least an average derivative value image and a standard deviation derivative pixel value image from said plurality of acquired images;

update said parametric representation according to predefined criteria;

analyze pixels of said image so as to determine which of said pixels are hot pixels, according to predefined criteria;

define at least one target from said hot pixels;

measure predefined parameters for at least one of said at least one target; and determine for at least one of said at least one target whether said target is of interest, according to application-specific criteria.

4. The apparatus of claim 1, wherein the processor is configured to compute, for each pixel of said parametric representation, a new average pixel value and a new standard deviation value, using the value of a newly acquired pixel and a predetermined weight coefficient.

5. The apparatus of claim 2, wherein the processor is configured to compute, for each pixel of said parametric representation, a new minimum pixel value and a new maximum pixel value, according to the value of a newly acquired pixel.

6. The apparatus of claim 5, wherein between said new minimum pixel value and a previous minimum pixel value there is a maximum difference equal to 1, and between said new maximum pixel value and a previous maximum pixel value there is a maximum difference equal to 1.

7. The apparatus of claim 3, wherein the processor is configured to compute, for each pixel of said parametric representation, a new average derivative pixel value and a new standard deviation derivative value, using the value of a newly acquired pixel and a predetermined weight coefficient.

8. The apparatus of claim 1, wherein the processor is configured to compute whether a pixel is a hot pixel by comparing a difference between an actual value and an average value of said pixel with the standard deviation of said pixel.

9. The apparatus of claim 2, wherein the processor is configured to compute whether a pixel is a hot pixel by comparing a difference between an actual value and the minimum and maximum values of said pixels.

10. The apparatus of claim 3, wherein the processor is configured to compute whether a pixel is a hot pixel by comparing the difference between an actual derivative value and an average derivative value of said pixel with the standard deviation derivative of said pixel.

11. A method of scene interpretation, comprising:

determining an initial parametric representation of said scene;

updating said parametric representation according to predefined criteria;

acquiring an image of said scene;

analyzing said image by determining which of said pixels are hot pixels, according to predefined criteria;

defining at least one target from said hot pixels;

measuring predefined parameters for at least one of said at least one target; and determining, for at least one of said at least one target whether said target is of interest, according to application-specific criteria; and outputting the results of said analysis;

wherein determining an initial parametric representation of said scene comprises computing said initial parametric representation from a plurality of acquired images and computing an average pixel image and a standard deviation pixel image from said plurality of acquired images.

12. A method of scene interpretation, comprising:

determining an initial parametric representation of said scene;

updating said parametric representation according to predefined criteria;

acquiring an image of said scene;

analyzing said image by determining which of said pixels are hot pixels, according to predefined criteria;

defining at least one target from said hot pixels;

measuring predefined parameters for at least one of said at least one target; and determining, for at least one of said at least one target whether said target is of interest, according to application-specific criteria; and outputting the results of said analysis;

wherein determining an initial parametric representation of said scene comprises computing said initial parametric representation from a plurality of acquired images and computing a minimum pixel value image and a maximum pixel value image from said plurality of acquired images.

13. A method of scene interpretation, comprising:

determining an initial parametric representation of said scene;

updating said parametric representation according to predefined criteria;

acquiring an image of said scene;

analyzing said image by determining which of said pixels are hot pixels, according to predefined criteria;

defining at least one target from said hot pixels;

measuring predefined parameters for at least one of said at least one target; and determining, for at least one of said at least one target whether said target is of interest, according to application-specific criteria; and outputting the results of said analysis;

wherein determining an initial parametric representation of said scene comprises computing said initial parametric representation from a plurality of acquired images and computing an average derivative value image and a standard deviation derivative pixel value image from said plurality of acquired images.

14. The method of claim 11, wherein updating said parametric representation comprises computing, for each pixel of said parametric representation, a new average pixel value and a new standard deviation value, using the value of a newly acquired pixel and a predetermined weight coefficient.

15. The method of claim 12, wherein updating said parametric representation comprises computing, for each pixel of said parametric representation, a new minimum pixel value and a new maximum pixel value, according to the value of a newly acquired pixel.

16. The method of claim 15, wherein between said new minimum pixel value and a previous minimum pixel value there is a maximum difference equal to 1, and between said new maximum pixel value and a previous maximum pixel value there is a maximum difference equal to 1.

17. The method of claim 13, wherein updating said parametric representation comprises means for computing, for each pixel of said parametric representation, a new average derivative pixel value and a new standard deviation derivative value, using the value of a newly acquired pixel and a predetermined weight coefficient.

18. The method of claim 11, wherein determining whether a pixel is hot comprises comparing the difference between an actual value and an average value of said pixel with the standard deviation of said pixel.

19. The method of claim 12, wherein determining whether a pixel is a hot pixel comprises comparing the difference between an actual value and the minimum and maximum values of said pixels.

20. The method of claim 13, wherein determining whether a pixel is a hot pixel comprises comparing the difference between an actual derivative value and an average derivative value of said pixel with the standard deviation derivative of said pixel.

* * * * *